(12) United States Patent
Hundscheidt et al.

(10) Patent No.: US 6,947,390 B2
(45) Date of Patent: Sep. 20, 2005

(54) METHOD FOR THE SELECTION OF TRANSMISSION ENTITIES

(75) Inventors: Frank Hundscheidt, Kerkrade (NL); Heino Hameleers, Kerkrade (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 804 days.

(21) Appl. No.: 09/947,105

(22) Filed: Sep. 5, 2001

(65) Prior Publication Data

US 2002/0075808 A1 Jun. 20, 2002

(30) Foreign Application Priority Data

Sep. 6, 2000 (EP) .............................................. 00119218

(51) Int. Cl.[7] .......................... G01R 31/08; H04L 12/28
(52) U.S. Cl. ...................... 370/252; 370/238; 370/390; 370/401; 705/37
(58) Field of Search ................................. 370/252, 254, 370/238, 401, 328, 338, 390, 432; 705/37

(56) References Cited

U.S. PATENT DOCUMENTS 6,345,090 B1 * 2/2002 Walker et al. ......... 379/114.12
6,522,735 B1 * 2/2003 Fortman et al. ....... 379/115.01

FOREIGN PATENT DOCUMENTS

| EP | 0982 901 A1 | 3/2000 |
| GB | 2 346 507 A | 8/2000 |

OTHER PUBLICATIONS

European Search Report, App. No. EP 00 11 9218, Mar. 9, 2001, pp. 1–3.

* cited by examiner

Primary Examiner—Duc Ho

(57) ABSTRACT

The invention relates to a method for selecting transmission entities for supporting services within and between networks. The problem of selecting a transmission entity, taking as well a plurality of service parameter as a plurality of transmission entities into account, is solved by sending a request including a set of parameter to a number of transmission entities. The receiver of said request check, whether they support the requested service, or if they can offer an alternative. They transmission to different transmission entities is performed offering a number of alternatives.

17 Claims, 3 Drawing Sheets

METHOD FOR THE SELECTION OF
TRANSMISSION ENTITIES

FIELD OF THE INVENTION

The invention relates to a method for the selection of transmission entities in communication networks.

BACKGROUND OF THE INVENTION

Communication networks usually comprise a plurality of transmission devices. Often, several of these devices can be used to support a service, alternatively or in combination. As the configuration of a network and the number of transmission entities within a network are subject to change during operation, fixed relations between network entities do not facilitate an optimal routing of calls.

The separation of call control and bearer control increases the number of alternatives to route a call within a network. For example in BICC (Bearer Independent Call Control) controlled networks, the call control is performed by control nodes like mobile services switching centre servers, transit switching centres, gateway mobile services switching centres, and GPRS (general packet radio system) support nodes. The payload transmission is performed by payload transmission devices like media gateways and the switching part of mobile services switching centres. Not only within but also outside of a network, nowadays a variety of alternatives exist, as several operators offer equal or compatible telecommunication services.

For the time being, calls are routed in an inflexible manner. It is state of the art that the routing of circuit switched calls is performed by using so called routing tables, comprising routing programs allocated to numbers of called subscribers. Commonly, one program is used to route all calls towards a certain subscriber number or group of subscriber numbers. Only in the case that the preferred program is not executable, e.g. due to device failure or congestion, a further program is used. To adapt the routing programs stored in the routing table, for example to a current traffic situation or changes in the network configuration, operator commands have to be performed.

This way of routing calls is quite static and forces operators either to update several routing tables at each change, or to accept a non-optimal routing of calls before an update. Non optimal routing causes costs either in network components that have to be oversized or in lack of revenues due to calls that cannot be switched.

In the U.S. Pat. No. 5,995,602, a more flexible routing scheme is described for select external networks. The patent suggests the introduction of a so-called moderator receives bids for services from external operators (carriers). The moderator sub the data, received from the carriers and often processed by said moderator, to local switches. By this, the moderator facilitates a fee minimised routing of calls from local switches through external networks.

It is a shortcoming of the solution proposed in the patent that fixed connections between carriers and the moderator are to be established. It is a further shortcoming of the invention that it only covers the connections from local switches via external networks. Another shortcoming is that the routing of calls is only optimised in respect of fees that are paid to the operators of carriers.

In the European Patent application EP 0 982 901, a bidding process is disclosed, wherein a request for bids is broadcasted for the transfer of a data packet. The received bids are analysed and a route is selected based on the analysis by using predefined metrics a cost and delay. This solution has the shortcoming that it only works in the cases that either no threshold value for a metric is defined, or that at least one bid is received that fulfils the criteria.

The British patent application GB2346507 discloses a routing method, wherein further communication elements are selected by a selection process. In the selection process, a network contacts a plurality of service providers to receive offers for a service. Based on the offers, the network selects a provider for a requested service. This solution also has the shortcoming that it only works in the cases that either no threshold value for a metric like cost or quality of service is defined, or that at least one bid is received that fulfils the criteria.

SUMMARY OF THE INVENTION

Therefore it is object of the invention to facilitate a selection of transmission entities with the possibility to define threshold values, even if no bid is received that fulfils the requested threshold.

It is advantageous that the selection of transmission entities is performed according to service parameter. This allows taking into account a plurality of parameter when selecting transmission entities.

It is further advantageous to select transmission entities by requesting bids. This facilitates changes of the structure of a network without the necessity of updating a large number of routing tables and supports an optimised routing through the network.

It is advantageous to implement an enrol unit. The enrol unit performs update changes in transmission entities in a, from a network point of view, decentralised manner.

It is advantageous to limit the time for the reception of bids or number of bids taken into account for a selection. This reduces or limits the time for the performance of a selection.

Further advantageous is the sending of a request for the submission of bids by a further transmission entity. This allows the recursive selection of transmission entities.

Especially advantageous is the use of a multicast service for the distribution of a request for the submission of bids. The use of the multicast service supports the subscription of further transmission entities in a very simple way.

Further advantageous is the use of a broadcast service for the distribution of a request for the submission of bids. This method is especially advantageous for the use in a limited area, because no administrative overhead is required.

Further advantageous is the locating of software agents in one of the transmission entities. This reduces signalling traffic between transmission entities, reduces the time for a decision and enables more sophisticated decision mechanisms.

Advantageous is the sending of a software agent after a start or a restart of a transmission entity. As mobile software agents are not part of the local software within a transmission entity, they are lost after a start or a restart. If the sender of the mobile software agent restarts or starts conditions for services might have changed and the data within a software agent have to be updated.

It is advantageous to distribute a time limit for returning bids according to claim 9. The time limit avoids unnecessary sending of bids.

According to the invention, a first transmission entity, like a control node, a bandwidth broker or a user equipment, selects a further transmission entity. A user equipment according to the invention is a communication device, for example one of a mobile handset, a fixed phone, a computer, or a fax machine. A bandwidth broker is an entity keeping track of quality of service resources within a certain domain. Before for example data packets are transmitted into said domain; an information is sent to the bandwidth broker. The bandwidth broker reserves the necessary resources for the transmission.

The method according to the invention is started by receiving a notification of an initiation event by the first transmission entity. Said notification can be received from an external or an internal source. Internal sources are for example timers, calenders or an operation system signalling that the first transmission started or restarted. An external source is any further transmission entity or an operator sending a signal comprising information about a start/restart of a further transmission entity, the expiring of a timer, a predefined time of the day, a predefined date or day of the week, that it changes the conditions for the support of a service, an operator command, or a service request.

The selection of a transmission entity is based on bids, sent by further transmission entities, on service requirements described by service parameter, and on operator and user requirements. The user requirements are for example stored in a database or entered by a user or an operator.

A further transmission entity is one of a control node, a control network, a subnetwork, a transmission device, a service, or a backbone network.

A transmission device is one of a node for example a switch, a control node, an access network node or a router, or a special device for example an announcement machine, a conference call device, a modem or a transcoder.

The further transmission entities return their bids as a response to a request for the submission of bids, sent by the first transmission entity. The distribution of the request is described in more detail by means of FIGS. 3, 4 and 5.

In a further embodiment of the invention, the sending of a request for the submission of bids is not necessarily performed by a first transmission entity, but by a portion of software, located in any of the transmission entities. In an embodiment of the invention, the software portion receives the bids and selects a transmission entity, sending an identification of the selected transmission entity to the first transmission entity.

In an embodiment of the invention, the telecommunication system is a UMTS (Universal Mobile Telecommunication System).

In a prefered embodiment of the invention, it is used to enable a plurality of operators or service providers to access a UMTS and use the transmission entities of the system for offering services. The invention is also used, to enable an operator of a UMTS to offer resources to further operators or service providers.

BRIEF DESCRIPTION OF THE DRAWINGS

In the following, the invention is described in more detail by means of figures and examples. The following figures show.

In the following equal reference numbers are used for equal elements.

DETAILED DESCRIPTION OF THE DRAWINGS

Figure 1:
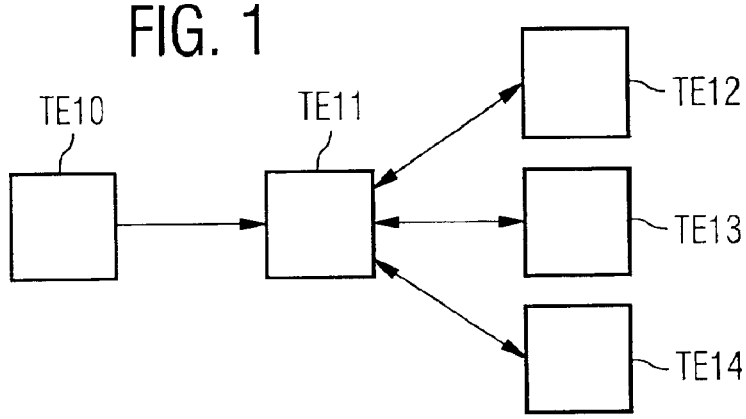
FIG. 1: a schematic diagram of a selection of a further transmission entity by a first transmission entity, the selection according to the invention.

FIG. 1 depicts the selection of a further transmission entity by a first transmission entity TE11. In a first step, the first transmission entity TE11 receives a service request from a transmission entity TE10. The transmission entity TE10 can be for example a user equipment or a transit switch of a further network.

The first transmission entity TE11, for example a mobile services switching centre server, analyses the service request in a next step. By the analysis service parameter of the requested service as kind of service, called subscriber identification, bandwidth, jitters, delay, round trip time, priority, costs and alike are determined.

In an embodiment of the invention, the service request comprises an indication of the importance of each service parameter.

Based on the results of the analysis, the transmission entity TE11 defines a request for the submission of bids. The request is transmitted to further transmission entities TE12, TE13, and TE14. The distribution of the request for the submission of bids is explained in more detail by means of FIGS. 3, 4, 5a, 5b, and 5c.

In an embodiment of the invention, said message comprises preconditions for a reception of the request for the submission of bids. Such restrictions can be for example related to the services that are to be switched, the time of the day or month, A-number, B-number or groups of the numbers of the connection, or combinations of the conditions. The preconditions may also be related to the request itself, for example that requests are only accepted at certain times.

Transmission entities TE12, TE13, and TE14 receive the request for submission of bids and analyse it. If a transmission entity supports the requested service it produces a bid. A bid is an offer to support the requested service, comprising certain values for relevant service parameter.

In a further embodiment of the invention, a bid is produced even if the transmission entity can not offer the requested service or fulfil all requirements, if the transmission entity can offer an alternative service. In a preferred embodiment it is indicated in the request for the sending of bids, whether the sender of the request permits such bids or not.

In a further embodiment of the invention, a request for the submission of bids includes an indicator whether negative bids shall be returned, too. That is, whether a transmission entity that is not interested in submitting a bid is asked to sent a message that it is not going to sent in a bid. Such messages are called negative bids. Negative bids can reduce the processing time required for the handling of a service request, especially if requests for the submission of bids are distributed by addressing certain transmission entities.

In a preferred embodiment of the invention, a bid is produced only if the further transmission entity TE12, TE13, or TE14 needs less network devices to set up a connection to the called subscriber than the sender of request, for example if it is closer to the called subscriber.

In a further embodiment of the invention, a request for the submission of bids can comprise a so-called optimal service offer, that is, the first transmission entity offering service with the conditions defined in the optimal service offer is selected.

In a next step the transmission entity returns the bid to the first transmission entity TE11.

In an embodiment of the invention, the request for submission of bids comprises a time information, indicating until when bids will be received for the requested service. A further transmission entity TE12, TE13, and TE14 produces and returns a bid only if the bid will be received with reasonable probability by the first transmission entity TE1 before the time has expired. The time information can be provided for example by an absolute time value until when bids will be received or a time interval within that a bid has to be returned.

In an embodiment of the invention, the request for submission of bids comprises an identification of a user or another transmission entity that is addressee for bids.

The first transmission entity TE11 receives the incoming bids. To avoid delays for the selection, a limit for the reception of bids is set. A limit is for example a time value until incoming bids will be received. Another limit is for example a maxim number of bids that will be received before selecting a transmission entity or a combination of both.

In a further embodiment of the invention, negative bids are returned by the further transmission entities. This enables to check whether all of the addressees of the request sent in a bid.

If no bid is received within a certain time interval, a predefined transmission entity is selected for the service. Another possibility is to reject service if no suiting bid is received. An incoming call, requesting the service will be released in this case. A preferred alternative is that at least one service parameter in the request for the submission of bids is modified if no acceptable bid is received, and that the modified request for the submission of bids is sent again.

In a next step, the first transmission entity TE11 compares the bids and the service parameter and selects a transmission entity to support the service based on the comparison.

In a preferred embodiment of the invention, the first transmission entity T comprises a decision matrix including a range of acceptable service parameter values for each relevant service parameter of a service.

In a further embodiment of the invention, the first transmission entity TE11 decides taking at least one of operator settings, network conditions, and user preferences into account.

In another embodiment of the invention, the first transmission entity forwards the bids to a user or another transmission entity and receives an identification of at least one selected transmission entity.

In a further embodiment of the invention, bids are sent by the further transmission entities to a user or another transmission entity. The another transmission entity selects at least one further transmission entity and sends an identification of the selected at least one further transmission entity to the first transmission entity.

The connection set up after selecting a transmission entity is performed as known to a person skilled in the art.

Figure 2:
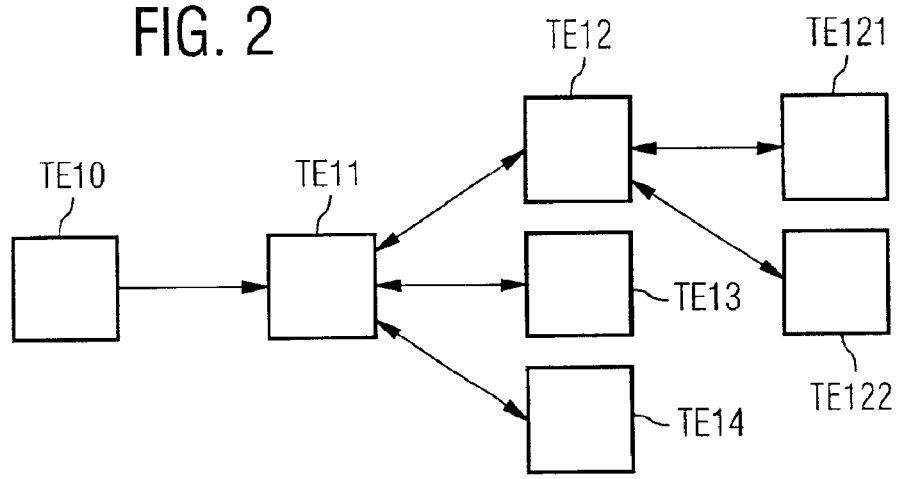
FIG. 2: schematic diagram of a selection according to FIG. 1, wherein a further transmission entity selects another further transmission entity before submitting a bid.

AN example of a transmission entity selecting further transmission entities is depicted in FIG. 2.

The steps of receiving a service request, analysing the service request, determining service parameter, defining a request for the submission of bids and sending the request are the same as described in FIG. 1. The further transmission entity TE12 analyses the request and recognises from the called subscriber identification or the destination point code that information from further transmission devices are necessary before submitting a bid. The further transmission entity produces a request for the submission of bids and sends it to further transmission entities TE121, TE122, and TE123. The further transmission entities perform the same steps as the further transmission entities TE13 and TE14 as described in FIG. 1.

After receiving the bids from the further transmission entities TE121, TE122, and TE123, the transmission entity TE12 analyses the bids and selects a further transmission entity based on the result of the analysis and the service parameter received in the request for submission of bids received from the transmission entity TE11. It produces a bid based on the service parameter received from the selected transmission entity TE121, TE122, or TE123 and its own capabilities and sends the bid to the first transmission entity TE11.

There are several ways to limit the time until a bid is returned for the case of recursive operation of the method. One way is to limit the number of recursions, for example by sending an indicator with the request for the submission of bids, that is incremented if a transmission entity produces a further request. If this in exceeds a predefined value, the bidding is terminated. Another way is to define a time value.

In a preferred embodiment the transmission entity TE12 received a time value in the request sent by the first transmission entity TE11. The further transmission entity TE12 checks whether said time value has expired before returning its bid.

Figure 3:
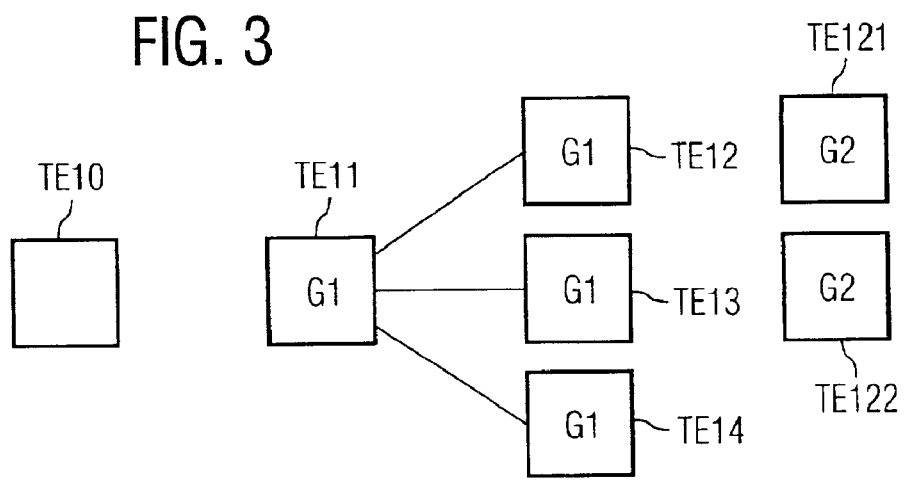
FIG. 3: a schematic diagram of a distribution of a request for the submission of bids according to the invention by using a multicast service.

FIG. 3 depicts the distribution of a request for the transmission of bids by using a multicast service. The configuration of transmission entities is the same as shown in FIG. 2. The transmission entities are subscribed to different multicasting groups. The transmission entities TE11, TE12, TE13, and TE14 are members of group G1, TE121, and TE122 are members of group G2. The transmission entity TE10 is member of no multicasting group.

In the situation depicted in FIG. 3, a multicasting message, in the example a request for the submission of bids has been sent to members of group G1. It is received by the transmission entities TE11, TE12, TE13, and TE14. As the transmission entities TE10, TE121 and TE122 are not members of G1, the message is not delivered to them.

Transmission entities can belong to a plurality of groups. Groups comprise members having at least one feature in common for example service offered, geographical area served, location, operator, low cost entities or any other feature. An example of a group is the group of transmission entities, capable of establishing 64 kbit connections. A transmission entity looking for a further transmission entity to set up a 64 kbit connection, will send a multicast message to said group. The members of the group will receive the request for the submission of bids and if they are interested in offering such a service, will proceed as described in FIGS. 1 and 2. A protocol used to register and unregistered to groups is for example the IGNT (Internet Group Multicast Protocol).

Multicasting is described, for example, in Computer Networks, third edition, by Andrew S. Tanenbaum, published 1996 which is incorporated herein by reference.

Figure 4:
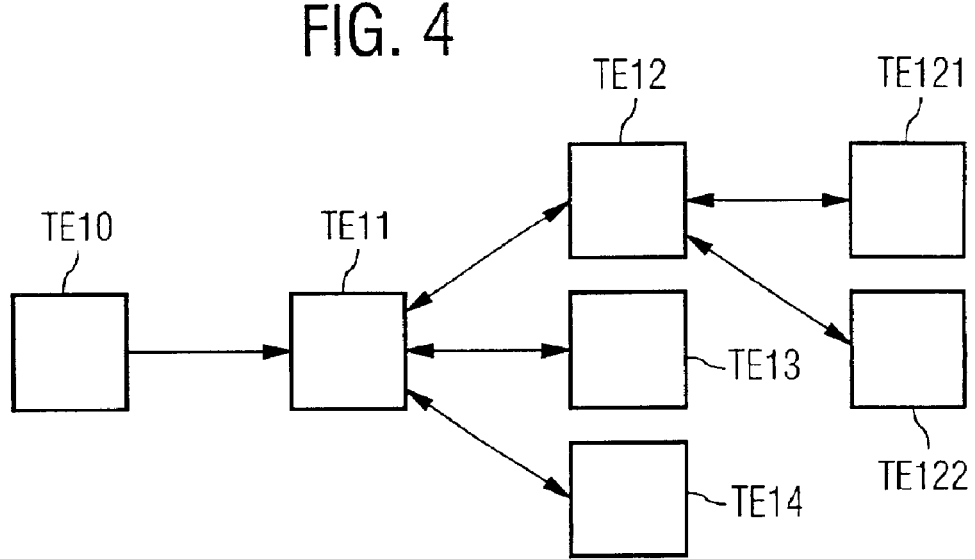
FIG. 4: a schematic diagram of a distribution of a request for the submission of bids according to the invention by using a broadcast service.

The distribution of a request for the submission of bids by using a broadcast service is depicted in FIG. 4. As shown in the figure every transmission entity TE10, TE11, TE12, TED, TE121 and TE122 receives the request, depicted by solid lines.

To reduce the number of entities and by that the signalling traffic within a network, the number of hubs that a broadcast message is allowed to pass can be restricted. That is for example, a request will be delivered only over four hubs. Another way to reduce the traffic is to restrict a broadcast message to a certain domain, for example a part of a network or to a local area network.

Figure 5A:
FIG. 5a: a schematic diagram of transmission entities, using static software agents for communicating.
Figure 5B:
FIG. 5b: a schematic diagram of transmission entities, the first transmission entity comprising a static software agent and a mobile software agent.
Figure 5C:
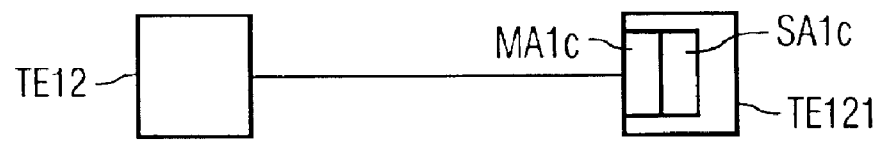
FIG. 5c: a schematic diagram of transmission entities, the further transmission entity comprising a static software agent and a mobile software agent.

By means of FIGS. 5a, 5b and 5c, the use of software agents is described. Software agents are portions of software, comprising code, status and data. So-called static agents stay within a transmission entity, so-called mobile agents, being capable of running on different platforms, are sent from one entity to another. Software agents perform certain tasks and work independently. They are capable of monitoring their environment and can act accordingly and they can control other their methods.

For simplicity reasons, only two transmission entities are depicted without limiting the invention to cases with only two transmission entities involved.

In the examples explained by means of FIGS. 5a, 5b and 5c, the agents selecting transmission entities SA1a, SA1b, and MA1c comprise decision logic, making decisions depending on the required service, user settings and service parameter. The decision logic includes guidelines for weighting service parameter offered bid. For example for a file transfer service according to ftp (file transmission protocol), the parameter costs, bandwidth and bit error rate are weighted strong than the parameter low jitters and delay. And vice versa for a speech connection requires a short delay, no jitters and is, to a certain extent, tolerant to a small bandwidth and a high bit error rate.

In an embodiment of the invention, weighting factors and minimum values for service parameter are allocated to each different kind of service within the decision logic of a software agent.

In FIG. 5a, a first transmission entity TE12 comprising a first software agent SA1a and a further transmission entity TE121 comprising a second software agent SA2a are depicted.

The static software agents SA1a and SA2a handle the communication between the transmission entities TE12 and TE121 for selection of entity purposes. Due to the communication between transmission entities being performed by said agents, for example using an agent communication language, there is a high flexibility when it comes to introduction of new functionality.

In an embodiment of the invention using software agents on either side of the communication, all steps of the selection of a transmission entity as described by FIGS. 1 and 2 are performed within said agents.

FIG. 5b depicts the transmission entities TE12 and TE121, the transmission entity TE12 comprising a static software agent SA1b and a mobile software agent MA1b, sent by the further transmission entity TE121.

Mobile software agents can be sent for example from a further transmission entity to the first transmission entity on demand of the first entity, after an reception of an initiating event like a start/restart of a first or a further entity, or whenever a change in the data or the program of the mobile agent has to be performed. For the sending of mobile agents, standard caching mechanisms can be used.

In an embodiment of the invention, a further transmission entity sends a mobile agent every time it changes the conditions for offering a service.

The mobile agent SA1b of the first transmission entity TE12 performs the steps of receiving a service request, for example from the transmission entity or from another transmission entity. It determines the service parameter from the service request and loads user settings, for example from subscription data of a calling party. Afterwards it defines a request for the submission of bids. If a time limit for granting the requested service exists, the mobile agent SA1b calculates either an absolute time before, or a time interval within, bids have to be returned. The time information is included in the request for the submission of bids.

In a next step it sends the request to the mobile agent MA1b. As the mobile agent MA1b is located within the same transmission entity, the communication between the agents is fast and does not use transmission resources outside the transmission entity.

The mobile agent MA1b receives the request for the submission of bids, analyses said request, and produces a bid. The bid is based on information included in the data of the mobile agent and on the result of said analysis. Data can be for example 10 information about the capacity, a pricing policy, and services offered by its sender. These data are included as well as a calculation mechanism when the mobile agent is defined. Here, the mobile agent cannot offer the requested service to the price defined in the request for the submission of bids. But it can offer another service for example with a lower bandwidth for the stated price.

The static agent SA1b receives the bid and analyses the bid. The bid does match the requirements for the service as defined by the user settings. As the offered other service with the lower bandwidth is not interesting, the agent SA1b defines a new request for an alternative service. It sends the request to the mobile agent MA1b.

The mobile agent MA1b receives the request and analyses it. As it can offer the service with the requested parameter, it returns a bid.

The static agent SA1b receives the bid, analyses the bid and as it matches the requirements accepts the bid.

In an embodiment of the invention, the mobile software agent MA1b collect charging and/or statistical information about services that are used by the agent's current host and executed by its sender.

In FIG. 5c, mobile agents MA1c and SA1c are located within a further transmission entity TE121. The mobile agent MA1c is sent by the first transmission entity TE12.

After receiving a service request, the first transmission entity TE12 forwards the service request to its mobile agents, one of them being the mobile agent MA1c. The further processing is performed as described in FIG. 5b, the mobile agent MA1c performing the steps of static agent SA1b and the static agent Aug. 30, 2001 SA1c performing the steps of mobile agent MA1b.

After the mobile agent MA1c selected a transmission entity, it sends a message to the transmission entity TE12, including an identification of the selected transmission entity and service parameter.

In a further embodiment of the invention, the mobile agent MA1c does not send a message but returns itself including said identification.

In an embodiment of the invention, the sender of the message identifies the selected transmission entity.

Figure 6:
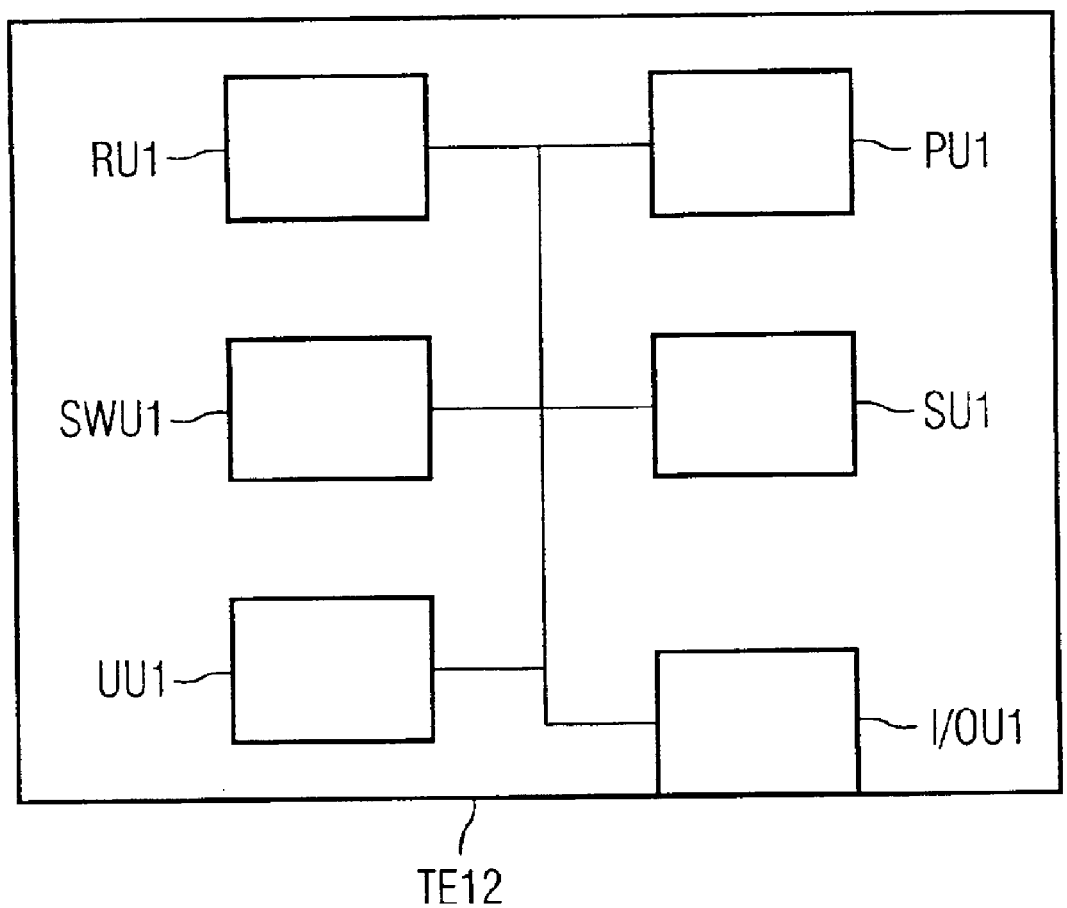
FIG. 6: a schematic diagram of a transmission entity according to the invention.

FIG. 6 depicts a transmission entity according to the invention. The transmission entity TE12 comprises a processing unit PU1, a routing unit RU1, a switching unit SWU1, an I/O unit I/OU1, a storage unit SU1 and an enrol unit UU1.

The units can be implemented as portions of software codes, as stored program electronic devices, or by any other means known to a person skilled in the art.

The processing unit PU1 co-ordinates the other units and processes information delivered by the I/O unit I/OU or stored in the storage unit SU1. It generates bids, generates requests for the submission of bids and processes bids received from further transmission entities.

The routing unit RU1 receives the results of the selection of a transmission entity, for example in the form of a routing program. In the case that a routing program is activated for a routing case, the switching unit SWU1 is controlled by using said routing program.

The switching unit SWU1 performs the switching. A group switch is one possible implementation, for example.

The I/O unit I/OU1 handles transmissions to further transmission entities. It sends and receives request for the submission of bids, bids and mobile software agents.

The storage unit SU1 stores data received by the I/O unit I/OU1. It may store software agents, also. In an embodiment of the invention, a table with further transmission entities is stored, also.

The enrol unit UU1 is responsible for securing the reception of requests for the submission of bids that are interesting for the transmission entity TE12. To make sure that request for the transmission of bids are received by the transmission entity, performs at least one of the following, depending on how said requests are distributed:

it subscribes the transmission entity TE12 in at least one anycasting group, used for the distribution of requests for the submission of bids, it subscribes the transmission entity TE12 in at least one multicasting group, used for the distribution of requests for the submission of bids, it receives a mobile agent from a transmission entity, it sends a mobile agent to at least one transmission entity, or it sends the address of transmission entity TE12 to at least one transmission entity.

The enrol unit UU1 subscribes the transmission entity TE12 to respective an anycasting or multicasting group by performing two steps. In a first step it informs the I/O unit I/OU1 that information, sent to a certain anycasting or multicasting group address, is to be received. The second step is sending information to routers in the telecommunication network, that information sent to said respective anycasting or multicasting group address shall be forwarded to the transmission entity TE12, too.

The enrol unit sends the address of the transmission entity to at least one transmission entity. The at least one transmission entity is a first or a further transmission entity, storing the address in a table used for distribution of requests for the transmission of bids.

What is claimed is:

1. A method for the selection of at least one transmission entity out of a plurality of transmission entities of a telecommunication system, comprising the steps of:

receiving an initiating event notification at a first transmission entity;

determining service parameters and defining a requested service responsive to receipt of the initiating event notification;

requesting submission of bids according to said service parameters from other transmission entities;

receiving a plurality of bids at said first transmission entity;

analysing the plurality of bids; and selecting at least one transmissions entity of the other transmission entities responsive to the analysed plurality of bids if an appropriate transmission entity is available, wherein the step of selecting further comprises the steps of:

if no appropriate transmission entity is selected, modifying the request for the submission of bids;

sending the modified request for the submission of bids to at least one transmission entity;

receiving at least one bid;

analysing the at least one bid; and if no appropriate transmission entity is available, rejecting the requested service.

2. The method of claim 1, wherein the step of selecting further comprises the step of deciding which of the plurality of bid is the most appropriate in comparison to the service parameters.

3. The method of claim 1, wherein the step of selecting further comprises the steps of:

sending the bids to another transmission entity; and receiving an identification of the selected at least one transmission entity.

4. The method of claim 1, wherein the step of receiving of bids is terminated after at least one of a threshold number of received bids or a selected amount of time or a combination of both.

5. The method of claim 1, wherein the request for the submission of bids is sent by using a multicast service.

6. The method of claim 1, wherein the request for the submission of bids is sent by using a broadcast service that is limited to a certain area.

7. The method of claim 1, wherein one transmission entity of the plurality of transmission entities comprises a software agent from another transmission entity, communicating with a software agent of the selected at least one transmission entity.

8. The method to claim 1, further including the step of sending a mobile agent to the first transmission entity in the case of a start/restart of the first transmission entity.

9. The method of claim 1, wherein the request for submission of bids further includes the step of informing the other transmission entities when the reception of a bid will be accepted.

10. A transmission entity, comprising:

a processing unit for processing bids, generating requests for submission of bids, generating bids, and processing bids;

a routing unit receiving the processed bids from the processing unit and generating switching information;

a switching unit for receiving the switching information from the routing unit and switching calls according to said switching information;

an I/O unit for receiving bids from and sending bids to other transmission entitles;

a storage unit for storing bids received by the I/O unit before they are processed by the processing unit; and an enrol unit for securing reception of requests for submission of bids by performing at least one of the following functions:

subscribing the transmission entity in at least one anycasting group, the at least one anycasting group used for the distribution of requests for the submission of bids;

subscribing the transmission entity in at least one multicasting group, the group used for the distribution of requests for the submission of bids;

receiving a mobile agent from a transmission entity;

sending a mobile agent to a transmission entity; or sending the transmission entity's address to further transmission entities.

11. A method for the selection of at least one transmission entity out of a plurality of transmission entities of a telecommunication system, comprising the steps of:

receiving an initiating event notification at a first transmission entity;

determining service parameters and defining a requested service responsive to receipt of the initiating event notification;

requesting submission of bids according to said service parameters from other transmission entities;

receiving a plurality of bids at said first transmission entity;

analysing the plurality of bids; and selecting at least one transmissions entity of the other transmission entities responsive to the analysed plurality of bids if an appropriate transmission entity is available, wherein the step of selecting further comprises the steps of:

if no appropriate transmission entity is selected, selecting one predefined transmission entity.

12. The method of claim 11, wherein the step of selecting further comprises the step of deciding which of the plurality of bid is the most appropriate in comparison to the service parameters.

13. The method of claim 11, wherein the step of selecting further comprises the steps of:

sending the bids to another transmission entity; and receiving an identification of the selected at least one transmission entity.

14. The method of claim 11, wherein the step of receiving of bids is terminated after at least one of a threshold number of received bids or a selected amount of time or combination of both.

15. The method of claim 11, wherein the request for the submission of bids is sent by using a multicast service.

16. The method of claim 11, wherein the request for submission of bids further includes the step of informing the other transmission entities when the reception of a bid will be accepted.

17. The method of claim 11, wherein said step of selecting said predefined transmission entity further comprises the steps of:

modifying the request for the submission of bids;

sending the modified request for the submission of bids to at least one transmission entity;

receiving at least one bid;

analyzing the at least one bid; and if no appropriate transmission entity is available, selecting said predefined transmission entity instead.

\* \* \* \* \*

UNITED STATES PATENT AND TRADEMARK OFFICE
CERTIFICATE OF CORRECTION

| | | |
|---|---|---|
| PATENT NO. | : 6,947,390 B2 | Page 1 of 1 |
| APPLICATION NO. | : 09/947105 | |
| DATED | : September 20, 2005 | |
| INVENTOR(S) | : Hundscheidt et al. | |

It is certified that error appears in the above-identified patent and that said Letters Patent is hereby corrected as shown below:

In Column 4, below "Line 43" reading "FIGS. 3, 4, 5a, 5b, and 5c.",
insert paragraph
-- In an embodiment of the invention, the request for the transmission of bids is sent to each further transmission entity in a single message. The first transmission entity comprises a table with addresses of transmission entities. A transmission entity that is interested in receiving a request for the submission of bids has to subscribe to this table for example by sending a message. --.

In Column 4, Line 45, delete "said" and insert -- the --, therefor.

In Column 7, Line 6, delete "IGNT" and insert -- IGMP --, therefor.

In Column 7, Line 14, delete "TED" and insert -- TE13 --, therefor.

In Column 11, Line 5, in Claim 10, delete "entitles;" and insert -- entities; --, therefor.

Signed and Sealed this

Twentieth Day of May, 2008

JON W. DUDAS
*Director of the United States Patent and Trademark Office*